United States Patent
Hoffman

(10) Patent No.: US 9,975,090 B2
(45) Date of Patent: May 22, 2018

(54) DOUBLE PASS REVERSE OSMOSIS SEPARATOR MODULE

(71) Applicant: Parker-Hannifin Corporation, Cleveland, OH (US)

(72) Inventor: Richard Hoffman, Torrance, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 109 days.

(21) Appl. No.: 15/000,679

(22) Filed: Jan. 19, 2016

(65) Prior Publication Data

US 2016/0207001 A1 Jul. 21, 2016

Related U.S. Application Data

(60) Provisional application No. 62/105,238, filed on Jan. 20, 2015, provisional application No. 62/213,202, filed on Sep. 2, 2015.

(51) Int. Cl.
| | |
|---|---|
| *B01D 61/08* | (2006.01) |
| *B01D 63/10* | (2006.01) |
| *B01D 63/02* | (2006.01) |
| *C02F 1/44* | (2006.01) |
| *B01D 61/02* | (2006.01) |

(52) U.S. Cl.
CPC .......... *B01D 61/08* (2013.01); *B01D 61/022* (2013.01); *B01D 63/02* (2013.01); *B01D 63/10* (2013.01); *C02F 1/441* (2013.01); *B01D 2319/025* (2013.01); *C02F 2201/003* (2013.01)

(58) Field of Classification Search
None
See application file for complete search history.

(56) References Cited

U.S. PATENT DOCUMENTS

| | | | |
|---|---|---|---|
| 3,669,879 A * | 6/1972 | Berriman | B01D 33/11 210/321.68 |
| 4,992,170 A | 2/1991 | Menon et al. | |
| 5,342,511 A | 8/1994 | Brown et al. | |
| 8,551,335 B2 | 10/2013 | Wieczorek et al. | |
| 2007/0163943 A1* | 7/2007 | Collins | A45F 3/20 210/335 |
| 2013/0020250 A1* | 1/2013 | Keller | B01D 61/58 210/321.87 |

FOREIGN PATENT DOCUMENTS

CN 204022514 U 12/2014

* cited by examiner

*Primary Examiner* — Krishnan S Menon
(74) *Attorney, Agent, or Firm* — Renner, Otto, Boisselle & Sklar, LLP

(57) ABSTRACT

A double-pass reverse osmosis (RO) separator module having two stages of RO filtration in a single assembly, including a radially outer RO assembly that surrounds a radially inner RO assembly, wherein each RO assembly includes an RO separation medium. The outer RO assembly may be used for a first-pass of RO filtration in which a first-pass feed liquid enters the outer RO assembly and is separated via reverse-osmosis to provide a permeate liquid and a concentrate liquid. The permeate liquid exiting the outer RO assembly may flow via fluid passages to the inner RO assembly for a second-pass of RO filtration in which the first-pass permeate liquid enters the inner RO assembly as a second-pass feed liquid and is separated via reverse-osmosis to provide a second-pass (i.e., double-filtered) permeate liquid.

19 Claims, 5 Drawing Sheets

DOUBLE PASS REVERSE OSMOSIS SEPARATOR MODULE

RELATED APPLICATIONS

This application claims the benefit of U.S. Provisional Application No. 62/105,238 filed Jan. 20, 2015 and U.S. Provisional Application No. 62/213,202 filed Sep. 2, 2015, both of which are hereby incorporated herein by reference in their entireties.

FIELD OF INVENTION

The present invention relates generally to reverse-osmosis separator modules, and more particularly to a double-pass reverse-osmosis separator module.

BACKGROUND

Reverse-osmosis (RO) is a liquid filtration technique that is suitable for a wide range of applications. For example, RO filtration is used in water purification processes to remove salts and other effluent from seawater or brackish water solutions. In a typical RO purification process, an RO separator module having an RO membrane is placed in a pressure vessel in which a supply of feed liquid (e.g., seawater) is pressurized against one side of the membrane. The RO membrane rejects the solutes in the feed liquid (e.g., salt and other effluent) to produce a concentrate liquid on the one side, and enables transport of a solute-free permeate liquid (e.g., salt-and-effluent-free water) across the membrane to the other side. The permeate liquid and concentrate liquid are each collected from the RO separator module through separate flow paths.

In some applications, such as drinking water purification, the permeate liquid collected from the RO separator module may be sufficiently free of salt or other effluent after a single pass through the RO separation medium. For other applications, such as semiconductor or electronics manufacturing, the permeate liquid must be considerably cleaner than what is typically capable of being achieved through a single pass. Traditionally, these more demanding applications use multiple RO separator modules connected downstream in series, such that the permeate liquid exiting an upstream RO module is then used as the feed liquid entering a separate downstream RO module for further purification. These daisy-chained configurations can take up considerable manufacturing floor space and can require extensive plumbing, which increases the costs associated with purifying the processing liquid.

SUMMARY OF INVENTION

The present invention provides a double-pass reverse osmosis (RO) separator module having two stages of RO filtration combined into a single assembly. More particularly, the double-pass reverse-osmosis separator module includes a radially outer RO assembly that surrounds a radially inner RO assembly, wherein each of the RO assemblies includes an RO separation medium that separates a feed liquid into concentrate liquid and permeate liquid. The double-pass RO separator module is configured such that the feed liquid (e.g., saltwater, etc.) enters one of the RO assemblies for a first-pass of filtration, and the permeate liquid exiting the first-pass RO assembly is supplied as a feed liquid to the other RO assembly for a second-pass of filtration, whereby the second-pass (double-filtered) permeate liquid may be collected and used. By providing an RO separation assembly that is internally nested within another RO separation assembly, the double-pass RO separator module enables a reduction in the overall size and/or linear footprint (among other considerations) that would otherwise be required for two-stages of RO filtration.

According to an aspect of the invention a double-pass reverse-osmosis separator module includes a radially outer RO assembly and a radially inner RO assembly surrounded by the radially outer RO assembly; wherein the RO assemblies each have a feed inlet, a concentrate outlet, a permeate outlet, and a reverse-osmosis separation medium interposed between the feed inlet and permeate outlet; and wherein at least one flow passage in the separator module directs flow from the permeate outlet of one of the RO assemblies to the feed inlet of the other RO assembly.

According to another aspect of the invention, a double-pass reverse-osmosis separator module includes a radially outer RO assembly and a radially inner RO assembly, the radially outer RO assembly surrounding the radially inner RO assembly.

The radially outer RO assembly may have a radially outer tubular wall having a longitudinal axis extending between opposite ends, a radially inner tubular wall extending along the longitudinal axis, a reverse-osmosis separation medium contained between the radially inner tubular wall and the radially outer tubular wall, a feed inlet, a concentrate outlet, and a permeate outlet.

The radially inner RO module may have a radially outer tubular wall having a longitudinal axis extending between opposite ends, a radially inner tubular wall extending along the longitudinal axis, a reverse-osmosis separation medium contained between the radially inner tubular wall and the radially outer tubular wall, a feed inlet, a concentrate outlet, and a permeate outlet.

The permeate outlet of the radially inner RO assembly or the radially outer RO assembly is in fluid communication with the feed inlet of the other of the radially inner RO assembly or the radially outer RO assembly.

Embodiments of the invention may include one or more of the following additional features separately or in combination.

For example, the radially outer RO assembly may be used for a first-pass of RO filtration of the feed liquid, and the permeate liquid exiting the radially outer RO assembly may flow through a flow passage to enter the radially inner RO assembly for a second-pass of RO filtration in which the first-pass permeate enters the radially inner RO assembly as a second-pass feed liquid for RO filtration so as to provide a second-pass (i.e., double-filtered) permeate liquid.

The radially inner tubular wall of the radially outer RO assembly and the radially outer tubular wall of the radially inner RO assembly may define an axial flow passage therebetween for enabling flow of the first-pass permeate liquid from the radially outer RO assembly toward one end of the radially inner RO assembly where the first-pass permeate liquid may enter the radially inner RO assembly as a second-pass feed liquid.

The radially inner RO assembly may be coaxial and concentric with the radially outer RO assembly, and the radially outer tubular wall of the radially inner RO assembly may be spaced from the radially inner tubular wall of the radially outer RO assembly to define an annular flow passage therebetween for enabling flow of the first-pass permeate liquid exiting the radially outer RO assembly to enter the radially inner RO assembly.

The radially inner RO assembly and the radially outer RO assembly may each be assembled as RO sub-modules.

For example, the radially inner RO sub-module may be telescopically inserted into an inner axial flow path defined by the radially inner tubular wall of the radially outer RO sub-module.

According to another aspect of the invention, a filter element includes a central perforate support core having an outlet end; an inner wound reverse-osmosis media layer supported by the inner support core, the inner wound reverse-osmosis media layer having axially-extending flow channels; an outer perforate support core surrounding the inner wound reverse-osmosis media layer, with an annular flow gap therebetween; and an outer wound reverse-osmosis media layer surrounding the outer perforate support core, whereby flow can pass through the outer wound reverse-osmosis media layer, through the outer support core and into the annular flow gap, and then axially along the periphery of the inner wound reverse-osmosis media layer to one end of the inner wound reverse-osmosis media layer and then axially through the flow channels of the inner wound reverse-osmosis media layer, and through the central support core to the outlet end.

According to another aspect of the invention, a method of filtering feed liquid via a double-pass reverse-osmosis separator module having a radially outer RO assembly surrounding a radially inner RO assembly, includes the steps: (i) passing the feed liquid into a feed inlet of the radially outer RO assembly for a first pass; (ii) passing the first-pass feed liquid through a semi-permeable membrane of a reverse osmosis separation medium contained within the radially outer RO assembly, whereby the first-pass feed liquid is separated into a first-pass concentrate liquid and a first-pass permeate liquid; (iii) passing the first-pass concentrate liquid through a concentrate outlet of the radially outer RO assembly; (iv) passing the first-pass permeate liquid through a permeate outlet of the radially outer RO assembly; (v) after the first-pass permeate liquid exits the permeate outlet of the radially outer RO assembly, passing the first-pass permeate liquid into a feed inlet of the radially inner RO assembly as a feed liquid for a second pass; (vi) passing the second-pass feed liquid through a semi-permeable membrane of a reverse osmosis separation medium contained within the radially inner RO assembly, whereby the second-pass feed liquid is separated into a second-pass concentrate liquid and a second-pass permeate liquid; (vii) passing the second-pass concentrate liquid through a concentrate outlet of the radially inner RO assembly; (viii) passing the permeate liquid through a permeate outlet of the radially inner RO assembly; and (ix) collecting the second-pass permeate liquid after the second-pass permeate liquid exits the permeate outlet of the radially inner RO assembly.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles of the present invention have particular application for reverse-osmosis separator modules used in pressurized liquid-separation processes, such as seawater desalination for industrial application, and thus will be described below chiefly in this context. It will of course be appreciated, and also understood, that principles of this invention may be applicable to other liquid-separation processes, such as seawater or brackish water desalination for producing drinking water, or for the concentration of food liquids, such as fruit juices or dairy-products. In addition, the principles of this invention may be used in the production of ultrapure water for the semi-conductor or pharmaceutical industries, for wastewater and waste reuse treatments, or any similar liquid-separation processes.

Figure 1:
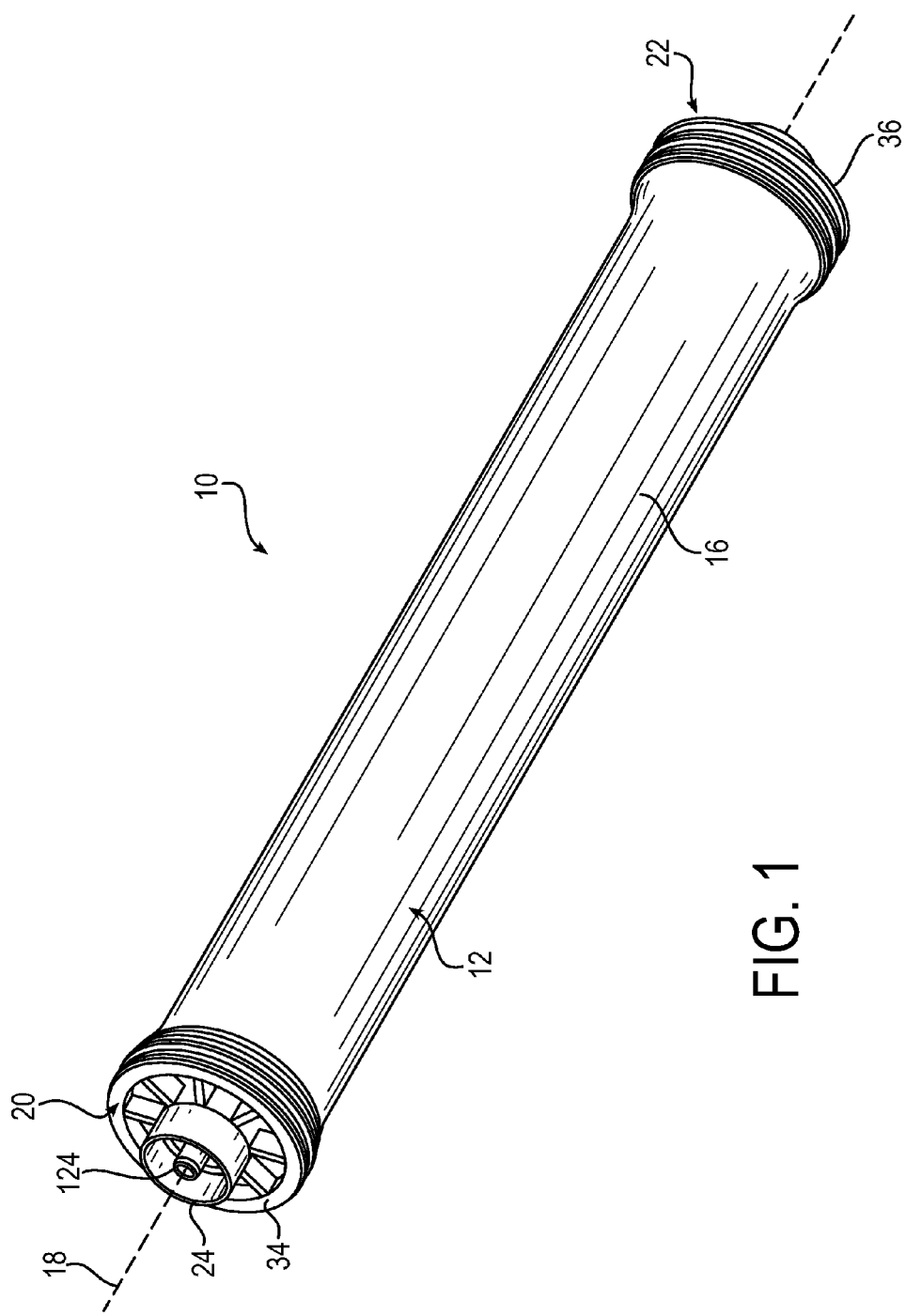
FIG. 1 is a perspective view of an exemplary double-pass reverse-osmosis separator module according to the invention.
Figure 2:
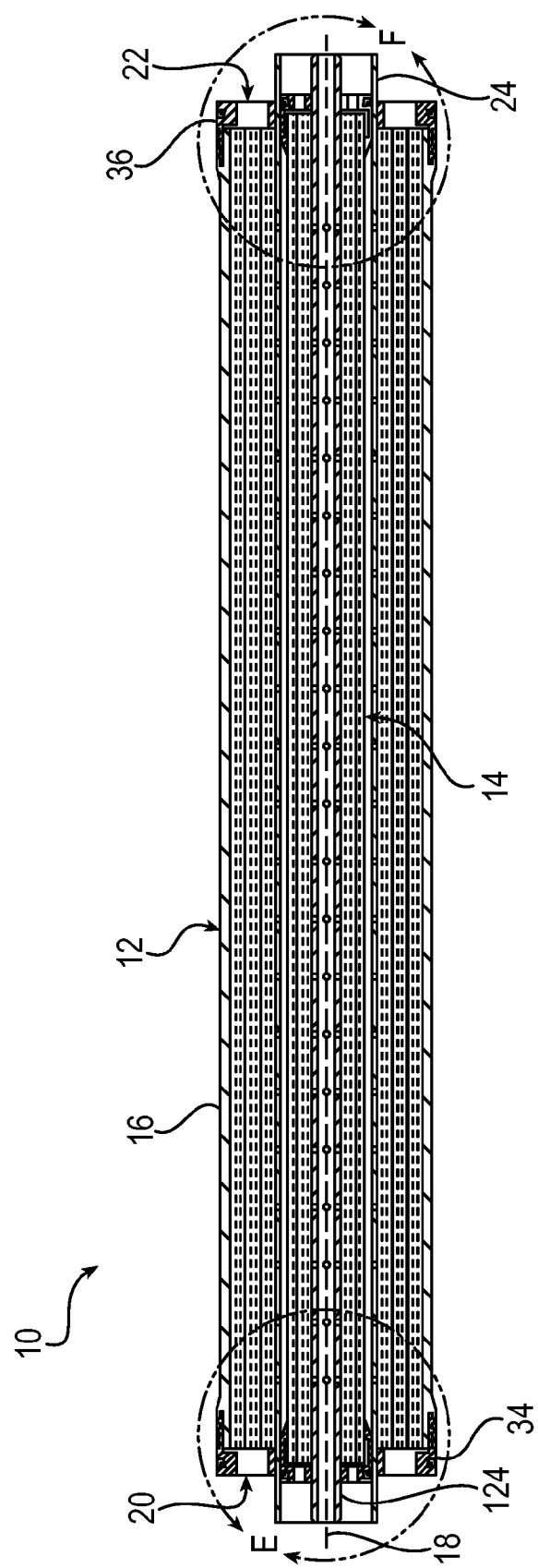
FIG. 2 is a cross-sectional view of the double-pass reverse-osmosis separator module in FIG. 1.
Figure 3:
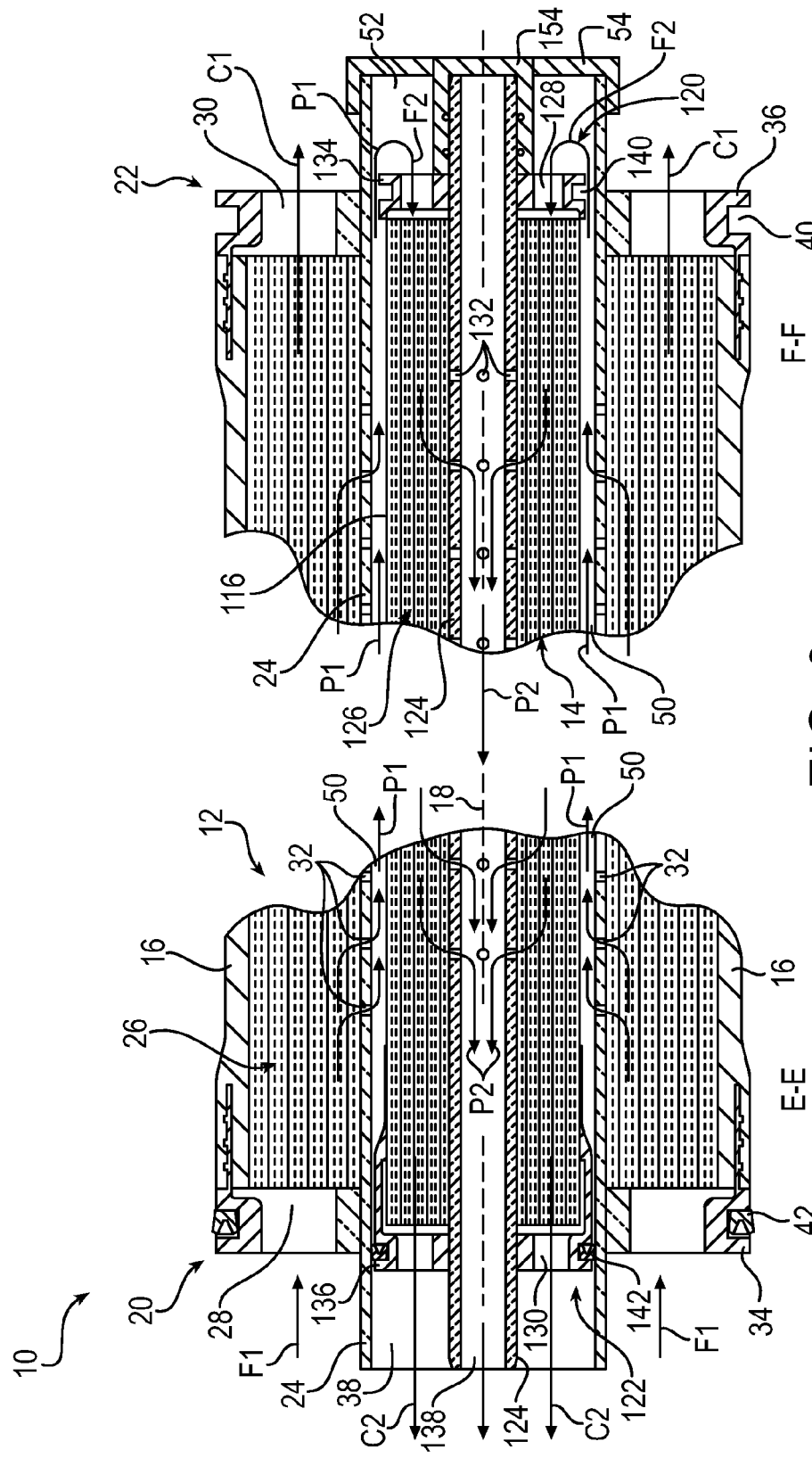
FIG. 3 is an enlargement of details E-E and F-F in FIG. 2.

Turning to FIGS. 1-3, an exemplary double-pass reverse-osmosis separator module 10 is shown. The double-pass reverse-osmosis separator module 10 (also referred to as a filter element) includes a radially outer RO assembly 12 (hereinafter the outer RO assembly 12) and a radially inner RO assembly 14 (hereinafter the inner RO assembly 12). The outer RO assembly 12 surrounds the radially outer surface of the inner RO assembly 14, and the inner RO assembly 14 may be completely contained within the outer RO assembly 12.

As will be discussed in further detail below, the outer RO assembly 12 may be considered a first-pass RO assembly, and the inner RO assembly 14 may be considered a second-pass RO assembly. For example, the outer RO assembly 12 may be used as a first-pass of RO filtration in which a feed liquid F1 enters the outer RO assembly 12 and is filtered or separated with a reverse-osmosis media to provide a permeate liquid P1 and a concentrate liquid C1. The permeate liquid P1 exiting the outer RO assembly 12 may flow via fluid passages to the inner RO assembly 14 for a second-pass of RO filtration in which the first-pass permeate liquid P1 enters the inner RO assembly 14 as a second-pass feed liquid F2 and is filtered or separated with a reverse-osmosis media to provide a second-pass (i.e., double-filtered) permeate liquid P2.

The outer RO assembly 12 may include a radially outer tubular wall 16 having a longitudinal axis 18 extending between opposite ends 20 and 22, a radially inner tubular wall 24 extending along the longitudinal axis 18, and a reverse-osmosis separation medium 26 contained between the radially inner tubular wall 24 and the radially outer tubular wall 16. The outer RO assembly 12 also includes at least one feed inlet 28 for enabling ingress of feed liquid F1, at least one concentrate outlet 30 for enabling egress of concentrate liquid C1, and at least one permeate outlet 32 for enabling egress of permeate liquid P1 from the outer RO assembly 12. In the illustrated embodiment, the feed inlet 28 is at one axial end 20 of the outer RO assembly 12, the concentrate outlet 30 is at the opposite axial end 22, and the permeate outlet 32 includes at least one radial through passage in the radially inner tubular wall 24.

The RO separation medium 26 (also referred to as an RO media layer) may include a variety of RO separation mediums, such as membrane-based (e.g., spiral-wound or hollow fiber) separation mediums, or other suitable-types of RO separation mediums. A suitable type of membrane construction for the RO separation medium 26 may be selected in a well-known manner for providing the desired flow rate, permeate flux, solute rejection, among other factors. For example, the membrane construction may include a semi-permeable membrane configured for separating the feed liquid F1 into permeate liquid P1 (which passes through the membrane) and concentrate liquid C1 (which contains the solutes rejected by the membrane). The semi-permeable membrane may include thin-film composite RO membranes, nanofiltration membranes, ultrafiltration membranes, and/or microfiltration membranes of a suitable type. Representative semi-permeable membranes may include those made from polysulfones, polyether sulfones, polyamides, polyacrylonitrile, polyfluroethylines, cellulose ester, or the like.

The RO separation medium 26 may have a cross-flow construction including axial flow paths and radial flow paths. More particularly, the axial flow paths of the RO separation medium 26 may be configured to enable feed liquid F1 to enter the RO separation medium 26 via the feed inlet 28, which may be located at the axial end 20 of the outer RO assembly 12. After the feed liquid F1 is filtered or separated into permeate liquid P1 and concentrate liquid C1, such as via the semi-permeable membrane, the axial flow paths in the RO separation medium 26 may be configured to enable the concentrate liquid C1 to flow axially and exit the RO separation medium 26 via the concentrate outlet 30, which may be located at the opposite axial end 22 of the outer RO assembly 12. The radial flow paths of the RO separation medium 26 may be configured to enable the permeate liquid P1 to flow radially to exit the RO separation medium 26 via the permeate outlet 32, such as via one or more radial through passages in the inner tubular wall 24, as will be discussed in further detail below.

The RO separation medium 26 may be formed as a flat-sheet construction that is spirally wound around and supported by the inner tubular wall 24. Such a flat-sheet construction may include the semi-permeable membrane layer interposed between a feed channel layer for providing the axial flow paths, and a permeate collection layer for providing the radial flow paths, which would enable permeate liquid P1 to flow in the spiral-radially inward direction toward the permeate outlet 32. The feed channel layer may be formed as a biplanar extruded net, and the permeate collection layer may be formed from a knit fabric, such as a tricot or simplex knit, made from a suitable material, such as polyester. The spiral-wound RO separation medium 26 may include one or more spiral wraps around the inner tubular wall 24, thus forming an RO separation medium body having a thickness or cross-section that may depend on the number of wraps and the size of the flow channels, which may be selected depending on the desired flow rate, permeate flux, solute rejection, pressure applied, among other factors.

The radially outer tubular wall 16 of the outer RO assembly 12 surrounds the radially outer surface of the RO separation medium 26. The outer tubular wall 16 may be configured to engage the radially outer surface of the RO separation medium 26 to reduce bypass of the feed liquid F1 (e.g., reduce passage of the feed liquid through an annulus formed between the interior surface of the outer tubular wall 16 and the outer surface of the RO separation medium 26) and/or reduce constriction and interruption of the separation medium flow paths. The outer tubular wall 16 may also be configured with a wall thickness that is so dimensioned for withstanding forces exerted on the outer tubular wall 16 without failure when the outer RO assembly 12 is operating under pressure, such as during the RO separation process, as will be described in further detail below. The outer tubular wall 16 may be made from suitable materials, such as metals, plastics or composites having sufficient lateral and burst strength to withstand the forces exerted on the outer tubular wall 16 without failure (e.g. without exceeding the yield strength or causing plastic deformation).

The materials selected for the outer tubular wall 16 may also be capable of withstanding corrosion and degradation by the feed liquid. For example, suitable metals may include stainless steels or copper-alloys; suitable plastics may include polypropylene, polyethylene, ABS, PVC, or similar plastics; and suitable composites may include fiberglass reinforced epoxy, or the like. Other rigid materials (e.g. having a hardness similar to or greater than polypropylene) may also be utilized.

The outer tubular wall 16 may be formed around the RO separation medium 26, such as by wrapping a fiber-reinforced polymer matrix composite (e.g., fiberglass impregnated with epoxy) around the RO separation medium 26. Alternatively or additionally, the radially outer tubular wall 16 may include a pre-formed shell housing, such as a polypropylene tube, for example. The pre-formed shell housing may define an inner chamber, and the RO separation medium 26 may be telescopically inserted into the shell housing. More particularly, the RO separation medium 26 may be telescopically inserted with a slip-fit tolerance for reducing bypass of the feed liquid and for reducing restriction of the flow paths when the reverse osmosis separation medium swells and compresses against the shell housing.

In the illustrated embodiment, the outer RO assembly 12 includes end caps 34 and 36. The end caps 34, 36 are shown as being disposed concentrically about the axial ends 20, 22 of the outer tubular wall 16. The end caps 34, 36 include end walls transverse to the longitudinal axis 18 that have axial through passages, which may correspond with the feed inlet 28 and concentrate outlet 30, respectively, for enabling liquid communication between the outside and inside of the outer RO assembly 12. The end walls of the end caps 34, 36 may also have one or more through passages (or openings) for enabling the permeate liquid to enter or exit the outer RO assembly 12, such as via an inner axial flow passage 38 defined by the outer tubular wall 16. The through passage in the respective end walls may be configured for receiving an end portion of the outer tubular wall 16 that defines the inner axial flow passage 38.

The end caps 34, 36 may also be provided for confining the RO separation medium 26 inside of the outer tubular wall 16, and may prevent telescoping (relative axial movement) of spiral-wound RO separation medium sheets. The end cap through passages may be formed between a plurality of vanes having radial cross-members for enabling liquid passage and for confining the RO separation medium 26. The end caps 34, 36 may also have a side surface that includes an outer annular groove 40 for receiving an annular seal member 42, such as a brine seal, for blocking liquid flow, as discussed below. The end caps 34, 36 may be affixed to the outer tubular wall 16 by suitable attachment means, such as by thermal welding, sonic welding, adhesive bonding, threading, fastening, and/or otherwise attaching. At least one of the end caps 34, 36 may also be integrally formed as a unitary member with the outer tubular wall 16, in which case the opposite end (e.g., axial end 22) would be capable of telescopically receiving the RO separation medium 26 and other components.

Still referring to FIGS. 1-3, the inner RO assembly 14 will now be described in further detail. The inner RO assembly 14 may have components that are substantially the same as or similar to the components of the outer RO assembly 12, but which may be sized to fit inside of the outer RO assembly 12, among other considerations. Consequently, the same reference numerals but indexed by 100 may be used to denote structures corresponding to similar structures in the inner RO assembly 14. In addition, the foregoing description of the components for the outer RO assembly 12 is equally applicable to the components of the inner RO assembly 14, except as noted below The inner RO assembly 14 includes a radially outer tubular wall 116 having a longitudinal axis (which may be the same as the longitudinal axis 18 of the outer RO assembly 12) extending between opposite ends 120 and 122, a radially inner tubular wall 124 extending along the longitudinal axis 18, and a reverse-osmosis separation medium 126 contained between the radially inner tubular wall 124 and the radially outer tubular wall 116. The inner RO assembly 14 also includes at least one feed inlet 128 for enabling ingress of feed liquid F2, at least one concentrate outlet 130 for enabling egress of concentrate liquid C2, and at least one permeate outlet 132 for enabling egress of permeate liquid P2 from the inner RO assembly 14. In the illustrated embodiment, the feed inlet 128 is at one axial end 120 of the inner RO assembly 14, the concentrate outlet 130 is at the opposite axial end 122, and the permeate outlet 132 includes at least one radial through passage in the radially inner tubular wall 124.

The RO separation medium 126 (also referred to as an RO media layer) of the inner RO assembly 14 may include a variety of RO separation mediums, such as membrane-based (e.g., spiral-wound or hollow fiber) separation mediums, or others. For example, the membrane construction may include a semi-permeable membrane, which may include nanofiltration membranes, ultrafiltration membranes, and/or microfiltration membranes of a suitable type, such as thin film composite membranes. The RO separation medium 126 may have a cross-flow construction including axial flow paths and radial flow paths, and may be formed as a flat-sheet construction spirally wound around the inner tubular wall 124, as discussed above with respect to the RO separation medium 26 of the outer RO assembly 12.

A suitable type of membrane construction for the RO separation medium 126 may be selected in a well-known manner for providing the desired flow rate, permeate flux, solute rejection, pressure applied, among other factors. The RO assembly 126 may be substantially the same type and/or have substantially the same configuration as the RO assembly 26; or the respective RO separation mediums 26, 126 may be different types, or have different constructions and/or different configurations. For example, as discussed below, the pressure applied to the inner RO assembly 14 for separating the second-pass feed liquid F2 may be less than the pressure applied to the outer RO assembly 12 for separating the first-pass feed liquid F1. In addition, the solute rejection and permeate flux requirements for the respective RO separation mediums 26, 126 may also be different, since the inner RO assembly 14 may filter the already-filtered liquid from the outer RO assembly 12. In this manner, the cross-sectional area, radial thickness, and/or size of the flow channels of the RO separation medium 26 of the outer RO assembly 12 may be greater than the cross-sectional area, radial thickness, and/or size of the flow channels of the RO separation medium 126 of the inner RO assembly 14, such as for enhancing flow rate and improving the permeate flux of the RO separation medium 26, among other considerations.

The radially outer tubular wall 116 of the inner RO assembly 14 surrounds the radially outer surface of the RO separation medium 126 and may be configured to reduce bypass of the feed liquid F2, as discussed above with respect to the radially outer tubular wall 16. The outer tubular wall 16 may also be provided to prevent intermixing of the permeate liquid P2 from the outer RO assembly 12 with the liquids from the inner RO assembly 14. The outer tubular wall 16 may be made from suitable materials, such as metals, plastics or composites having sufficient lateral and burst strength to withstand the forces exerted on the outer tubular wall 116 without failure. The materials selected for the outer tubular wall 116 may also be capable of withstanding corrosion and degradation by the feed liquid.

A suitable type and/or construction of the outer tubular wall 116 may be selected in a well-known manner, and may be similar to or different from the outer tubular wall 16 of the outer RO assembly 12. For example, as discussed above, the pressure applied to the inner RO assembly 14 for separating the second-pass feed liquid F2 may be less than the pressure applied to the outer RO assembly 12. In this manner, the outer tubular wall 116 of the inner RO assembly 14 may have a wall thickness that is less than the wall thickness of the outer tubular wall 16 of the outer RO assembly 12. For example, the outer tubular wall 116 of the inner RO assembly 14 may be an impermeable thin-film that is wrapped around the RO separation medium 126. Where additional strength may be required, the outer tubular wall 116 may include a fiber-reinforced polymer matrix composite. Alternatively or additionally, the outer tubular wall 116 may include a pre-formed shell housing having an inner chamber.

In the illustrated embodiment, the inner RO assembly 14 includes end caps 134 and 136, which may be substantially the same as or similar to the end caps 34 and 36 of the outer RO assembly 12. The end caps 134, 136 include end walls with axial through passages, which may correspond with the feed inlet 128 and concentrate outlet 130. The end walls of the end caps 134, 136 may also have one or more through passages (or openings) for enabling the permeate liquid to enter or exit the inner RO assembly 14, such as via an inner axial flow passage 138 defined by the outer tubular wall 116. The end cap through passages may be formed between a plurality of vanes having radial cross-members. The end caps 134, 136 may each have a side surface that includes an outer annular groove 140 for receiving an annular seal member 142, such as a brine seal, for blocking liquid flow, as discussed above. The end caps 134, 136 may be affixed to the outer tubular wall 116 by suitable attachment means, as described above.

Still referring to FIGS. 1-3, the exemplary double-pass RO separator module 10 will be described in further detail with respect to the combined configuration of the inner RO assembly 14 and the outer RO assembly 12. Although the outer RO assembly 12 and inner RO assembly 14 have been thus far referred to as assemblies, it is understood that the respective units 12 and 14 may be formed and/or fabricated together, either simultaneously or consecutively, such as by assembling the RO separator module 10 with the radially innermost components (e.g., inner tubular wall 124) first and the radially outermost components (e.g., outer tubular wall 16) last, or vice versa. It is also understood that the inner RO assembly 14 and outer RO assembly 12 may be made as independent sub-modules, and the radially inner RO sub-module (e.g., 14) may be telescopically inserted into an inner axial flow passage (e.g., 38) of the radially outer RO sub-module (e.g., 12). Such a modular configuration may enhance tailorability of system design, improve maintenance costs by enabling replacement of only one of the RO sub-modules that needs replaced, among other considerations.

As shown in the illustrated embodiment and described above, the radially inner tubular wall 24 of the outer RO assembly 12 surrounds the radially outer tubular wall 116 of the inner RO assembly 14 and may define at least a portion of the axial flow passage 34 that is in fluid communication with the permeate outlet 32 and enables flow of the permeate liquid P1 from the outer RO assembly 12 toward at least one end (e.g., 120) of the inner RO assembly 14. The permeate outlet 32 may include at least one radial through passage in the inner tubular wall 24. More particularly, the permeate outlet 32 may include a plurality of radial through passages, such as perforations or the like, which may be radially and axially spaced in a predetermined pattern along the radially inner tubular wall 24. In this regard, the radially inner tubular wall 24 may form an outer perforate support core. It is understood that the permeate outlet 132 of the inner RO assembly 14 may have a configuration that is substantially the same as or similar to the configuration of the permeate outlet 32 of the outer RO assembly 12, and similar reference numerals are used to refer to the same or similar features. Also in this regard, the radially inner tubular wall 124 may form a central perforate support core.

The inner RO assembly 14 may be coaxially and concentrically disposed within the outer RO assembly 12, and the radially outer tubular wall 116 of the inner RO assembly 14 may be spaced from the radially inner tubular wall 24 of the outer RO assembly 12 to define an annular flow passage 50. The annular flow passage 50 may be sufficiently spaced to provide adequate flow of the permeate liquid P1, preferably without turbulence. The radially outer tubular wall 116 may be spaced from the radially inner tubular wall 24 using spacers, vanes, spokes, or other suitable spacing means that will enable flow of the first-pass permeate liquid P1 along the annular flow path. Alternatively or additionally, the brine seal 142 of the inner RO assembly 14 and/or an end wall or plug (described below) may be used to space the respective tubular walls 24 and 36. It is understood that although the flow path between the inner RO assembly 14 and the outer RO assembly 12 is shown as an annular passage, other configurations are also possible. For example, the inner tubular wall 24 and/or the outer tubular wall 116 may include channels or grooves that extend along the longitudinal axis and align with the radial through passages.

The inner tubular wall 24 of the outer RO assembly 12 may extend beyond at least one of the axial ends 120, 122 of the outer tubular wall 116 of the inner RO assembly 14, and may terminate at an end wall transverse to the longitudinal axis 18 so as to define a chamber 52. The chamber 52 may be configured to enable the permeate liquid P1 to flow into the feed inlet 128 at the axial end 120 of the inner RO assembly 14 as a second-pass feed liquid F2 for purification thereof. The chamber 52 may be an annular chamber, as shown, and/or may have a volume that is sized to provide a desired backpressure for forcing the feed liquid F2 through the inner RO assembly 14, which may also be dependent on the flow rate of permeate liquid P1 entering into the chamber 152.

The end wall defining a portion of the chamber 52 may include a closure 54 for restricting the liquid from exiting the flow passage 38 at an axial end thereof. For example, the closure 54 may include a cap, a plug, a fluid coupling, and/or an integral portion of the inner tubular wall 24. The closure 54 may be threaded, thermally welded, adhered, fastened, and/or otherwise attached to the inner tubular wall 24. In the illustrated embodiment, the inner RO assembly 14 also includes a closure 154, which may be substantially the same as or similar to the closure 38, for preventing flow from exiting the axial end of the flow passage 138. In addition, as discussed above, the respective end walls or closures 38, 138 may facilitate rigidly fixing the inner RO assembly 14 within the outer RO assembly 12 to provide sufficient spacing for the annular flow passage 50. It is understood that although the closure 138 is shown as attached to the inner tubular wall 124, the end wall or closure 38 of the outer RO assembly 12 may also be configured to engage the axial end of the inner tubular wall 124 to block flow and/or rigidly hold the inner RO assembly 14 in position.

Referring particularly to FIG. 3, an operation of the exemplary double-pass RO separator module 10 will be described. The RO separator module 10 may be placed in a pressure vessel 400 (shown in FIG. 4) for effecting the RO liquid-separation process. The pressure vessel 400 has an inlet for the feed liquid F1 to enter a chamber of the pressure vessel 400. The brine seal 42 of the outer RO assembly 12 provides a sealing engagement between the interior wall of the pressure vessel chamber and the outer RO assembly end cap 34 for preventing the feed liquid F1 from bypassing the RO separator module 10. Suitable closures or fluid couplings may also be provided toward the inlet end (e.g., 20) of the inner tubular wall 24 and/or 124 for preventing the feed liquid F1 from entering the inner axial flow passage 38 and/or 138.

As shown in the illustrated embodiment, the feed liquid F1 enters the outer RO assembly 12 as it passes through the feed inlet 28, for example through the passages in the end cap 34 at the axial end 20. The feed liquid F1 enters the RO separation medium 26, such as at an axial end thereof, and may pass along axial flow paths, for example, flow paths provided by a feed channel layer in a spiral-wound membrane construction. The pressure exerted by the pressure vessel 400 separates the feed liquid F1 by a reverse-osmosis liquid-separation process. For example, the pressure vessel 400 may force the feed liquid F1 against one side of a semi-permeable membrane of the RO separation medium 26, which causes the permeate liquid P1 to transport across the semi-permeable membrane, and also causes the solutes to be rejected to the concentrate liquid C1 on the other side of the membrane. The pressure exerted by the pressure vessel 400 is typically greater than the osmotic pressure of the feed liquid, which may be between about 10-600 psi for purification of fresh and brackish waters, or between about 600-1200 psi, more preferably about 900 psi, for desalination of seawater.

The concentrate liquid C1 passes through the RO separation medium 26, for example through axial flow paths provided in the RO separation medium 26, to the concentrate outlet 30, which may be located at the opposite axial end 22 of the outer RO assembly 12, whereby the concentrate liquid C1 exits the outer RO assembly 12. The concentrate liquid C1 may exit the pressure vessel 400 after a single pass, or the concentrate liquid C1 may be used as feed liquid for further purification in subsequent downstream RO separation modules that are combined in series, as described below with exemplary reference to FIGS. 4 and 5.

The permeate liquid P1 passes through the RO separation medium 26 to the permeate outlet 32, for example through radial flow paths, such as via spiral-radial flow paths provided by a permeate collection layer in a spiral-wound membrane construction. Thereafter, the first-pass permeate liquid P1 passes through the permeate outlet 32, which may include at least one radial through passage in the radially inner tubular wall 24, then into the annular flow passage 50 between the inner tubular wall 24 and the outer tubular wall 116. In the illustrated embodiment, the first-pass permeate liquid P1 passes axially along the annular flow passage 50 toward the axial end 22 of the outer RO assembly 12 and then into the chamber 52. After the first-pass of filtration, the concentration of solute or other effluent in the permeate liquid P1 may have been reduced from the first-pass feed liquid F1 by at least 80%, more preferably by more than 90%, even more preferably by greater than 95%. For example, the first-pass RO assembly may reduce the amount of solute (e.g., salt) in the feed liquid F1 from about 32,000 ppm to about 100 ppm in the first-pass permeate liquid P1.

After the first-pass permeate liquid P1 flows from the permeate outlet 32, for example through the annular flow passage 50 and/or into the chamber 52, the permeate liquid P1 then passes into the feed inlet 128 of the inner RO assembly 14 as feed liquid F2 for a second pass of filtration. The feed liquid F2 enters the inner RO assembly 14 as it passes through the feed inlet 128, for example through the passages in the end cap 134 at the axial end 120. The feed liquid F2 enters the RO separation medium 126, such as at an axial end thereof, and may pass along axial flow paths, for example, flow paths provided by a feed channel layer in a spiral-wound membrane construction. In response to the flow of permeate liquid P1 through the flow paths, such as the annular flow passage 50 and/or the chamber 52, a back-pressure is generated that forces the feed liquid F2 through the RO separation medium 126 and causes separation of the feed liquid F2 into concentrate liquid C2 and permeate liquid P2 by the reverse-osmosis liquid-separation process, as discussed above. The force exerted by the back-pressure is typically greater than the osmotic pressure of the feed liquid F2, which for the already-purified liquid may be between about 50 to 250 psi, more preferably about 100-200 psi.

The concentrate liquid C2 passes through the RO separation medium 126, for example through axial flow paths provided in the RO separation medium 126, to the concentrate outlet 130, which may be located at the opposite axial end 122 of the inner RO assembly 14, where the concentrate liquid C2 exits the inner RO assembly 14. The concentrate liquid C2 may exit the pressure vessel 400 after a single pass, or the concentrate liquid C2 may be used as feed liquid for further purification in subsequent downstream RO separation modules.

The permeate liquid P2 passes through the RO separation medium 126 to the permeate outlet 132, for example through radial flow paths, such as via spiral-radial flow paths provided by a permeate collection layer in a spiral-wound membrane construction. Thereafter, the second-pass (double-filtered) permeate liquid P2 passes through the permeate outlet 132, which may include at least one radial through passage in the radially inner tubular wall 124, then into the inner axial flow passage 138, where the permeate liquid P2 may flow axially and exit the inner RO assembly 14 through an outlet at the axial end of the inner tubular wall 124. After the double-filtered permeate liquid P2 exits the inner RO assembly 14, the permeate liquid P2 may be collected for use. After the second-pass of filtration, the concentration of solute or other effluent in the permeate liquid P2 may have been reduced from the first-pass feed liquid F1 by at least 80%, more preferably by more than 85%, even more preferably by greater than 90%. For example, the second-pass RO assembly may reduce the amount of solute (e.g., salt) in the feed liquid F2 from about 100 ppm to about 10 ppm in the second-pass permeate liquid P2.

Figure 4:
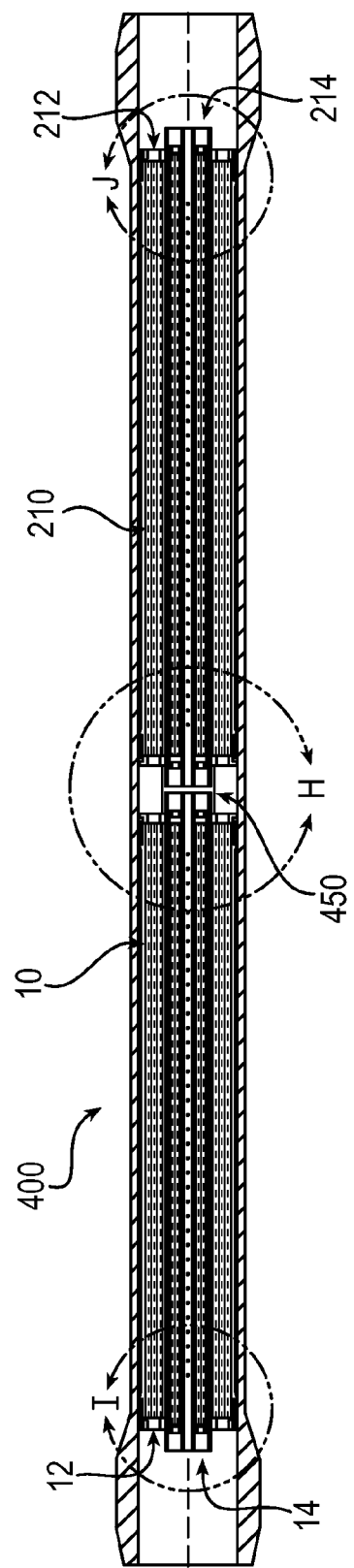
FIG. 4 is a cross-sectional view of a pressure vessel containing the double-pass reverse osmosis separator module in FIG. 2 in combination with another similar double-pass reverse osmosis separator module according to the invention.
Figure 5:
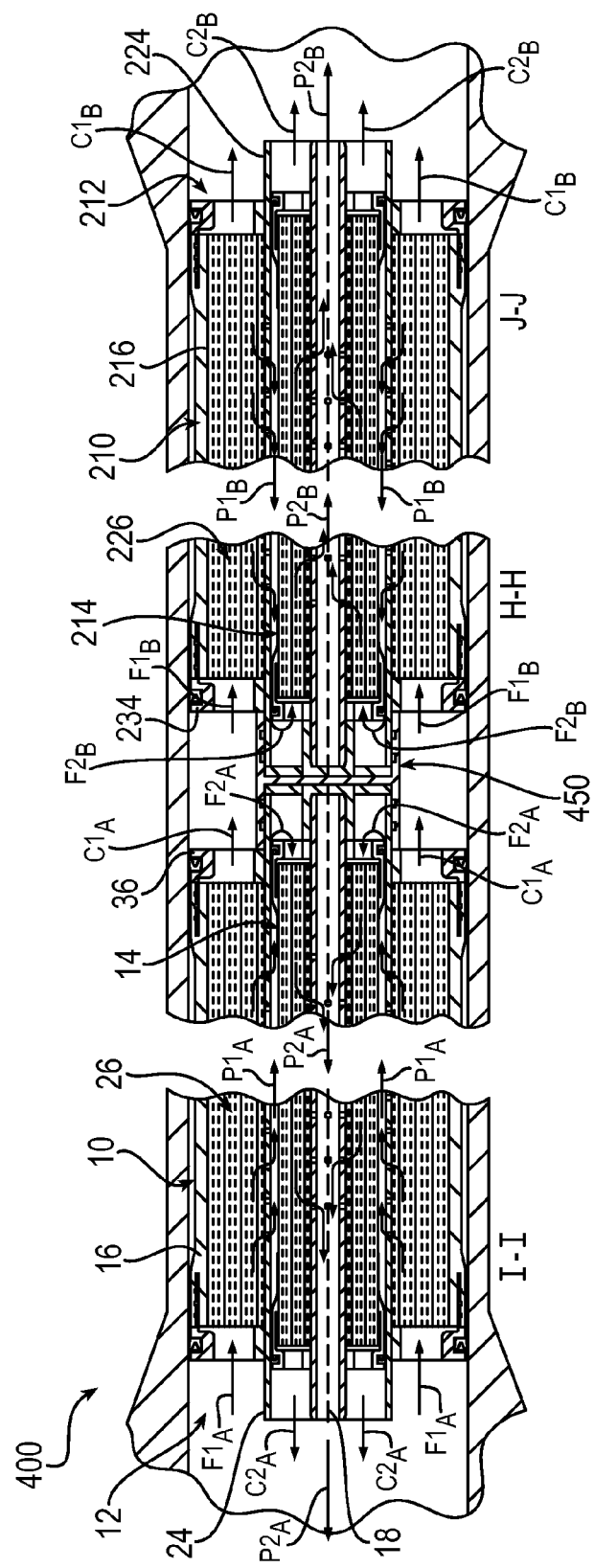
FIG. 5 is an enlargement of the details I-I, H-H, and J-J in FIG. 4.

Turning to FIGS. 4 and 5, an exemplary combination of double-pass RO separator modules 10 and 210 in the pressure vessel 400 are shown. The double-pass RO separator module 10 is substantially the same as described above, except for the end wall or closure (e.g., 54) as noted below. The double-pass RO separator module 210 is substantially the same as the double-pass RO separator module 10, and consequently the same reference numerals but indexed by 200 are used to denote structures corresponding to similar structures. In addition, the foregoing description of the double-pass RO separator module 10 is equally applicable to the double-pass RO separator module 210 except as noted below. Moreover, aspects of the double-pass RO separator modules 10 and 210 may be substituted for one another or used in conjunction with one another where applicable.

As discussed above with respect to the exemplary operation of the double-pass RO separator module 10, the double-pass RO separator module may be placed in a chamber of the pressure vessel 400 for effecting the RO liquid-separation process. In the illustrated embodiment, two double-pass RO separator modules 10 and 210 are combined in series within the pressure vessel 400. Such as configuration may provide two streams of double-filtered permeate liquid P2 from a single pressure vessel, which may reduce the number of pressure vessels and/or associated fluid circuitry that may otherwise be required for double-filtering feed liquid.

The operation of the double-pass RO separator module 10 is the same as described above, however, in the illustrated embodiment of FIG. 5, the corresponding feed liquids, concentrate liquids, and permeate liquids have been given the subscript "A" to indicate that they correspond with the first double-pass RO separator module 10. The operation of the double-pass RO separator module 210 is the same as the operation of the double-pass RO separator module 10, however, as shown in the illustrated embodiment, the flow paths of some of the liquids (i.e., permeate liquid $P1_B$, feed liquid $F2_B$, concentrate liquid $C2_B$, and permeate liquid $P2_B$) are in the opposite direction so as to restrict intermixing of flow paths with the first RO module 10. The corresponding feed liquids, concentrate liquids, and permeate liquids have been given the subscript "B" to indicate that they correspond with the second double-pass RO separator module 210.

As shown in the illustrated embodiment, the concentrate liquid $C1_A$ exiting the first double-pass RO separator module 10 flows downstream within the pressure vessel chamber and enters the second double-pass RO separator module 210 as a feed liquid $F1_B$. The respective double-pass RO separator modules 10, 210 may be operatively coupled to one another at axial ends. For example, a coupling 450 may be provided to couple the respective double-pass RO modules 10, 210 and also to block flow of the concentrate liquid C1A from intermixing with the respective feed liquids $F2_A$, $F2_B$ of the respective RO modules. It is understood that the coupling 450 may cooperate with, or include at least a portion of, the end wall or closure (e.g., 54 and/or 154) for preventing the respective feed liquids $F2_A$, $F2_B$ from escaping and/or intermixing with each other. The coupling 450 may also form a part of the chamber 52. Alternatively or additionally, the coupling 450 may cooperate with, or include at least a portion of, the end cap (e.g., 36). Alternatively or additionally, the end cap 36 of the first double-pass RO module 10 may be configured to operatively couple with the end cap 234 of the second double-pass RO module 210 to interconnect the respective reverse-osmosis separator modules in series and provide a direct flow passage of the concentrate liquid C1A to the feed liquid F1B. Optionally, the respective end caps 36 and 234 may be configured as being the same end cap.

As discussed herein, an exemplary double-pass reverse osmosis (RO) separator module may have two stages of RO filtration combined into a single assembly. More particularly, the exemplary double-pass reverse-osmosis separator module may include a radially outer RO assembly that surrounds a radially inner RO assembly, wherein each of the RO assemblies includes an RO separation medium that separates a feed liquid into concentrate liquid and permeate liquid. The double-pass RO separator module may be configured such that the feed liquid (e.g., saltwater, etc.) enters one of the RO assemblies for a first-pass of filtration, and the permeate liquid exiting the first-pass RO assembly is supplied as a feed liquid to the other RO assembly for a second-pass of filtration, whereby the second-pass (double-filtered) permeate liquid may be collected and used. By providing an RO separation assembly that is internally nested within another RO separation assembly, the double-pass RO separator module may enable a reduction in the overall size and/or linear footprint (among other considerations) that would otherwise be required for two-stages of RO filtration.

According to an aspect of the invention a double-pass reverse-osmosis separator module includes a radially outer RO assembly and a radially inner RO assembly surrounded by the radially outer RO assembly; wherein the RO assemblies each have a feed inlet, a concentrate outlet, a permeate outlet, and a reverse-osmosis separation medium interposed between the feed inlet and permeate outlet; and wherein at least one flow passage in the separator module directs flow from the permeate outlet of one of the RO assemblies to the feed inlet of the other RO assembly.

According to another aspect of the invention, a double-pass reverse-osmosis separator module includes a radially outer RO assembly and a radially inner RO assembly, the radially outer RO assembly surrounding the radially inner RO assembly.

The radially outer RO assembly may have a radially outer tubular wall having a longitudinal axis extending between opposite ends, a radially inner tubular wall extending along the longitudinal axis, a reverse-osmosis separation medium contained between the radially inner tubular wall and the radially outer tubular wall, a feed inlet, a concentrate outlet, and a permeate outlet.

The radially inner RO module may have a radially outer tubular wall having a longitudinal axis extending between opposite ends, a radially inner tubular wall extending along the longitudinal axis, a reverse-osmosis separation medium contained between the radially inner tubular wall and the radially outer tubular wall, a feed inlet, a concentrate outlet, and a permeate outlet.

The permeate outlet of the radially inner RO assembly or the radially outer RO assembly is in fluid communication with the feed inlet of the other of the radially inner RO assembly or the radially outer RO assembly.

Embodiments of the invention may include one or more of the following additional features separately or in combination.

For example, the permeate outlet of the radially outer RO assembly may include at least one radial through passage in the radially inner tubular wall of the radially outer RO assembly.

The permeate outlet of the radially inner RO assembly may include at least one radial through passage in the radially inner tubular wall of the radially inner RO assembly.

The radially inner tubular wall of the radially outer RO assembly and the radially outer tubular wall of the radially inner RO assembly may define an axial flow passage therebetween.

The feed inlet of the radially inner RO assembly may be at an axial end thereof.

The feed inlet of the radially outer RO assembly may be at an axial end thereof.

At least one chamber may be defined by at least one portion of the radially inner tubular wall of the radially outer RO assembly extending beyond at least one of the axial ends of the radially outer tubular wall of the radially inner RO assembly and terminating at an end wall disposed transverse to the longitudinal axis of the radially outer RO assembly.

The end wall may include a closure, a cap, a plug, and/or an integral portion of the radially inner tubular wall of the radially outer RO assembly.

The radially inner tubular wall of the radially outer RO assembly may define an inner axial flow passage radially inward of the radially inner tubular wall, the inner axial flow passage being in fluid communication with the permeate outlet of the radially outer RO assembly via the at least one radial through passage in the radially inner tubular wall of the radially outer RO assembly for enabling permeate liquid to flow through the inner axial flow passage toward one of the axial ends of the radially outer RO assembly.

The radially inner tubular wall of the radially inner RO assembly may define an inner axial flow passage radially inward of the radially inner tubular wall, the inner axial flow passage being in fluid communication with the permeate outlet of the radially inner RO assembly via the at least one radial through passage in the radially inner tubular wall of the radially inner RO assembly for enabling permeate liquid to flow through the inner axial flow passage toward one of the axial ends of the radially inner RO assembly.

The radially inner RO assembly may be coaxial and concentric with the radially outer RO assembly.

The radially outer tubular wall of the radially inner RO assembly may be spaced from the radially inner tubular wall of the radially outer RO assembly to define an annular flow passage therebetween.

The respective reverse osmosis separation mediums of the radially outer RO assembly and the radially inner RO assembly may have a cross-flow construction including axial flow paths and radial flow paths.

The respective reverse osmosis separation mediums of the radially outer RO assembly and the radially inner RO assembly may be spirally wound around the respective radially inner tubular walls of the radially outer RO assembly and the radially inner RO assembly.

The respective reverse osmosis separation mediums of the radially outer RO assembly and the radially inner RO assembly may include a semi-permeable membrane.

For one or more of the respective reverse osmosis separation mediums: (1) the axial flow paths may enable feed liquid to enter the reverse osmosis separation medium via the feed inlet located at one axial end, (2) the semi-permeable membrane may be configured to separate the feed liquid into permeate liquid and concentrate liquid, (3) the axial flow paths may enable the concentrate liquid to exit the reverse osmosis separation medium via the concentrate outlet located at an opposite axial end, and (4) the radial flow paths may enable the permeate liquid to exit the reverse osmosis separation medium via the permeate outlet.

The respective permeate outlets of the radially inner RO assembly and the radially outer RO assembly may include at least one radial through passage in the respective radially inner tubular walls of the radially outer RO assembly and the radially inner RO assembly, which may be in fluid communication with respective inner axial flow passages for enabling the permeate liquid to flow axially and exit the respective inner axial flow passages at one or more of the axial ends.

By way of example, when feed liquid enters the feed inlet at one axial end of the radially outer RO assembly for a first pass, then the feed liquid may flow along the axial flow paths of the reverse osmosis separation medium, and then flows through the semi-permeable membrane, whereby the feed liquid may be separated into concentrate liquid and permeate liquid.

Then the concentrate liquid may flow along the axial flow paths of the reverse osmosis separation medium and may exit the concentrate outlet at an opposite axial end of the radially outer RO assembly.

The permeate liquid may flow along the radial flow paths of the reverse osmosis separation medium and exit the permeate outlet through at least one radial through passage in the radially inner tubular wall of the radially outer RO assembly.

Then the permeate liquid may flow along the axial flow passage between the radially inner tubular wall of the radially outer RO assembly and the radially outer tubular wall of the radially inner RO assembly toward one axial end of the radially inner RO assembly.

By way of example, when the permeate liquid enters the feed inlet at the one axial end of the radially inner RO assembly as a feed liquid for a second pass, then the feed liquid may flow along the axial flow paths of the reverse osmosis separation medium of the radially inner RO assembly, and then may flow through the semi-permeable membrane, whereby the feed liquid is separated into concentrate liquid and permeate liquid.

Then the concentrate liquid may flow along the axial flow paths of the reverse osmosis separation medium and exits the concentrate outlet at an opposite axial end of the radially inner RO assembly.

The permeate liquid may flow along the radial flow paths of the reverse osmosis separation medium and exit the permeate outlet through at least one radial through passage in the radially inner tubular wall of the radially inner RO assembly.

Then the permeate liquid may flow along an inner axial flow passage radially inward of the radially inner tubular wall of the radially inner RO assembly, and then exit the radially inner RO assembly through one or more axial ends.

In some embodiments, at least one of the respective reverse osmosis separation mediums may include a semi-permeable membrane selected from the group consisting of: microfiltration membrane, nanofiltration membrane, and ultrafiltration membrane.

The reverse osmosis separation mediums of the radially outer RO assembly or the reverse osmosis separation medium of the radially inner RO assembly may be a different type of reverse osmosis separation medium from the other reverse osmosis separation medium of the radially outer RO assembly or the reverse osmosis separation medium of the radially inner RO assembly.

The reverse osmosis separation medium of the radially outer RO assembly or the reverse osmosis separation medium of the radially inner RO assembly may have a different radial thickness than the reverse osmosis separation medium from the other reverse osmosis separation medium of the radially outer RO assembly or the reverse osmosis separation medium of the radially inner RO assembly.

The reverse osmosis separation medium of the radially outer RO assembly may have a radial thickness that is greater than the radial thickness of the reverse osmosis separation medium of the radially inner RO assembly.

The at least one radial through passage in the radially inner tubular wall of the radially outer RO assembly and/or the radially inner tubular wall of the radially inner RO assembly may include a plurality of radial through passages.

The plurality of radial through passages may include a plurality of perforations through the radially inner tubular wall.

The plurality of perforations may be radially and axially spaced in a predetermined pattern along the radially inner tubular wall.

The radially outer tubular wall of the radially outer RO assembly and/or the radially outer tubular wall of the radially inner RO assembly may include a fiber-reinforced polymer matrix composite.

For example, the fiber-reinforced polymer matrix composite may include a fiberglass reinforced epoxy composite.

At least one of the radially outer tubular wall of the radially outer RO assembly and the radially outer tubular wall of the radially inner RO assembly may include from a pre-formed shell housing.

The pre-formed shell housing of the radially outer RO assembly and/or the radially inner RO assembly may define an inner chamber, and the respective reverse osmosis separation mediums of the radially outer RO assembly and the radially inner RO assembly may be telescopically inserted in the respective inner chambers of the respective pre-formed shell housings.

The pre-formed shell housing of the radially outer RO assembly and/or the radially inner RO assembly may be selected from the group consisting of: polypropylene, polyethylene, ABS, PVC, and other rigid thermoplastics capable of withstanding corrosion and degradation by the feed liquid.

The inner diameter of the shell housing of the radially outer RO assembly and/or the radially inner RO assembly may be so dimensioned for receiving the respective reverse osmosis separation mediums with a slip-fit tolerance for reducing bypass of the feed liquid and for reducing restriction of the flow paths when the reverse osmosis separation medium swells and compresses against the shell housing.

The radially outer tubular wall of the radially outer RO assembly and/or the radially inner RO assembly may have a wall thickness that is so dimensioned for withstanding forces exerted on the radially outer tubular wall without failure when pressure is exerted on the radially outer tubular wall.

The radially outer tubular wall of the radially outer RO assembly may have a wall thickness that is greater than the wall thickness of the radially outer tubular wall of the radially inner RO assembly.

The radially outer tubular wall of the radially inner RO assembly may be an impermeable thin-film wrapped around the reverse osmosis separation medium.

At least one of the radially outer RO assembly and the radially inner RO assembly may include at least one end cap located at one or more axial ends.

One or more of the at least one end caps may have an end wall disposed transverse to the longitudinal axis of the radially outer tubular wall.

The at least end wall may have at least one through-passage for enabling liquid flow therethrough.

The at least one through-passage of the at least one end wall may include a plurality of through-passages configured as a plurality of vanes having radial cross-members for reducing telescoping of the reverse osmosis separation medium.

The at least one through-passage of the at least end wall of the at least one end cap may include an opening configured for receiving the radially outer tubular wall.

One or more of the at least one end caps may be affixed to the radially outer tubular wall of the radially outer RO assembly and/or the radially outer tubular wall of the radially inner RO assembly by thermal welding, sonic welding, adhesive bonding and/or threading.

One or more of the at least one end caps may have a side surface with an outer annular groove.

The outer annular groove of the at least one end cap may include a brine seal for blocking liquid flow.

At least one of the radially inner tubular wall of the radially outer RO assembly and the radially inner tubular wall of the radially inner RO assembly may include a closure for blocking liquid flow at one of the axial ends.

The closure may include a cap, a plug, an end wall, or a similar closure.

Each of the radially inner RO assembly and the radially outer RO assembly may be assembled as RO sub-modules.

The radially inner RO sub-module may be telescopically inserted into an inner axial flow path defined by the radially inner tubular wall of the radially outer RO sub-module.

The at least one end cap of the radially outer RO assembly may be configured to operatively connect with an at least one end cap of another radially outer RO assembly that is similar to the first-mentioned radially outer RO assembly.

The closure located at the axial end of the radially inner tubular wall of the radially outer RO assembly may be configured to operatively connect with a closure located at the axial end of the radially inner tubular wall of another radially outer RO assembly that is similar to the first-mentioned radially outer RO assembly.

A combination of a first exemplary double-pass reverse-osmosis separator module according to any of the foregoing may be operatively coupled at one of the axial ends with another similar or same exemplary double-pass reverse-osmosis module.

A pressure vessel may including at least one double-pass reverse-osmosis separator module according to any of the foregoing.

According to another aspect of the invention, a filter element includes a central perforate support core having an outlet end; an inner wound reverse-osmosis media layer supported by the inner support core, the inner wound reverse-osmosis media layer having axially-extending flow channels; an outer perforate support core surrounding the inner wound reverse-osmosis media layer, with an annular flow gap therebetween; and an outer wound reverse-osmosis media layer surrounding the outer perforate support core, whereby flow can pass through the outer wound reverse-osmosis media layer, through the outer support core and into the annular flow gap, and then axially along the periphery of the inner wound reverse-osmosis media layer to one end of the inner wound reverse-osmosis media layer and then axially through the flow channels of the inner wound reverse-osmosis media layer, and through the central support core to the outlet end.

According to another aspect of the invention, a method of filtering feed liquid via a double-pass reverse-osmosis separator module having a radially outer RO assembly surrounding a radially inner RO assembly, includes the steps: (i) passing the feed liquid into a feed inlet of the radially outer RO assembly for a first pass; (ii) passing the first-pass feed liquid through a semi-permeable membrane of a reverse osmosis separation medium contained within the radially outer RO assembly, whereby the first-pass feed liquid is separated into a first-pass concentrate liquid and a first-pass permeate liquid; (iii) passing the first-pass concentrate liquid through a concentrate outlet of the radially outer RO assembly; (iv) passing the first-pass permeate liquid through a permeate outlet of the radially outer RO assembly; (v) after the first-pass permeate liquid exits the permeate outlet of the radially outer RO assembly, passing the first-pass permeate liquid into a feed inlet of the radially inner RO assembly as a feed liquid for a second pass; (vi) passing the second-pass feed liquid through a semi-permeable membrane of a reverse osmosis separation medium contained within the radially inner RO assembly, whereby the second-pass feed liquid is separated into a second-pass concentrate liquid and a second-pass permeate liquid; (vii) passing the second-pass concentrate liquid through a concentrate outlet of the radially inner RO assembly; (viii) passing the permeate liquid through a permeate outlet of the radially inner RO assembly; and (ix) collecting the second-pass permeate liquid after the second-pass permeate liquid exits the permeate outlet of the radially inner RO assembly.

The exemplary method may include one or more of the following additional features separately or in combination.

For example, the passing the first-pass feed liquid through the semi-permeable membrane of the reverse osmosis separation medium of the radially outer RO assembly may include applying a pressure between 500 to 1,000 psi to the first-pass feed liquid.

For example, the passing the second-pass feed liquid through the semi-permeable membrane of the reverse osmosis separation medium of the radially inner RO assembly may include applying a pressure between 50 to 250 psi to the second-pass feed liquid.

For example, the separating the first-pass feed liquid into the first-pass concentrate liquid and the first-pass permeate liquid via the semi-permeable membrane of the reverse osmosis separation medium of the radially outer RO assembly may include reducing the concentration of solute or other effluent from the first-pass feed liquid to the first-pass permeate liquid by at least 80%.

For example, the separating the second-pass feed liquid into the second-pass concentrate liquid and the second-pass permeate liquid via the semi-permeable membrane of the reverse osmosis separation medium of the radially inner RO assembly may include reducing the concentration of solute or other effluent from the second-pass feed liquid to the second-pass permeate liquid by at least 80%.

Although the invention has been shown and described with respect to a certain embodiment or embodiments, it is obvious that equivalent alterations and modifications will occur to others skilled in the art upon the reading and understanding of this specification and the annexed drawings. For example, although the outer RO assembly has been described as the first-pass RO assembly, the inner RO assembly may be the first-pass RO assembly and the flow paths could flow radially outwardly to the outer RO assembly for the second-pass. The flow passages or flow paths between respective feed inlets, concentrate outlets, and/or permeate outlets may have been described as passages, channels or gaps between components, but may also include fluid conduits, tubes, or other suitable fluid circuitry. Although the second-pass RO assembly may be pressurized with back-pressure from the first-pass RO assembly, it is understood that the second-pass feed liquid could be pressurized by an external source, such as a pump or similar means. Although the inner RO assembly has been illustrated as a single inner RO assembly concentric and coaxial with the outer RO assembly, it is understood that multiple inner RO assemblies may be provided within the outer RO assembly. The multiple inner RO assemblies may be provided in series end-to-end, or may be stacked within the inner axial flow passage of the outer RO assembly such that they would not be coaxial, but may instead surround the longitudinal axis. With regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A double-pass reverse-osmosis (RO) separator module comprising:
   a radially outer RO assembly; and
   a radially inner RO assembly surrounded by the radially outer RO assembly;
   wherein each of the radially inner RO assembly and the radially outer RO assembly has a feed inlet, a concentrate outlet, a permeate outlet, a perforated collection tube, and a reverse-osmosis separation medium interposed between the feed inlet and the permeate outlet, wherein the reverse-osmosis separation medium is spirally wound around the perforated collection tube;
   wherein the reverse-osmosis separation medium of the radially inner RO assembly and the reverse-osmosis separation medium of the radially outer RO assembly each include a reverse-osmosis membrane layer, a feed channel layer, and a permeate collection layer spirally wound around the respective perforated collection tube; and
   wherein at least one flow passage in the RO separator module directs flow from the permeate outlet of the radially outer RO assembly to the feed inlet of the radially inner RO assembly.

2. The double-pass reverse-osmosis separator module according to claim 1, wherein the permeate outlet of the radially outer RO assembly includes a plurality of perforations extending through a radially inner tubular wall of the collection tube of the radially outer RO assembly; or
   wherein the permeate outlet of the radially inner RO assembly includes a plurality of perforations extending through a radially inner tubular wall of the collection tube of the radially inner RO assembly.

3. The double-pass reverse-osmosis separator module according to claim 1, wherein a radially inner tubular wall of the radially outer RO assembly and a radially outer tubular wall of the radially inner RO assembly define an axial flow passage therebetween.

4. The double-pass reverse-osmosis separator module according to claim 1, wherein the feed inlet of the radially inner RO assembly is at an axial end thereof; or
   wherein the feed inlet of the radially outer RO assembly is at an axial end thereof.

5. The double-pass reverse-osmosis separator module according to claim 1, wherein at least one chamber is defined by at least one portion of a radially inner tubular wall of the radially outer RO assembly extending beyond at least one of the axial ends of a radially outer tubular wall of the radially inner RO assembly and terminating at an end wall disposed transverse to the longitudinal axis of the radially outer RO assembly.

6. The double-pass reverse-osmosis separator module according to claim 5, wherein the end wall includes a closure, a cap, a plug, and/or an integral portion of the radially inner tubular wall of the radially outer RO assembly.

7. The double-pass reverse-osmosis separator module according to claim 2, wherein the radially inner tubular wall of the radially outer RO assembly defines an inner axial flow passage radially inward of the radially inner tubular wall, the inner axial flow passage being in fluid communication with the permeate outlet of the radially outer RO assembly via at least one of the plurality of perforations through in the radially inner tubular wall of the radially outer RO assembly for enabling permeate liquid to flow through the inner axial flow passage toward one of the axial ends of the radially outer RO assembly.

8. The double-pass reverse-osmosis separator module according to claim 1, wherein the radially inner RO assembly is coaxial and concentric with the radially outer RO assembly; and
   wherein a radially outer tubular wall of the radially inner RO assembly is spaced from a radially inner tubular wall of the radially outer RO assembly to define an annular flow passage therebetween.

9. The double-pass reverse-osmosis separator module according to claim 1, wherein the respective reverse osmosis separation mediums of the radially outer RO assembly and the radially inner RO assembly have a cross-flow construction including axial flow paths and radial flow paths.

10. The double-pass reverse-osmosis separator module according to claim 1, wherein the reverse osmosis separation mediums of the radially outer RO assembly and the radially inner RO assembly are different.

11. The double-pass reverse-osmosis separator module according to claim 2, wherein the respective plurality of perforations are radially and axially spaced in a predetermined pattern along the respective radially inner tubular walls.

12. The double-pass reverse-osmosis separator module according to claim 1, wherein the radially outer RO assembly and/or the radially inner RO assembly includes at least one end cap located at one or more axial ends;
   wherein the at least one end cap has an end wall, the end wall having at least one through-passage, the at least one through-passage including an opening configured for receiving the respective collection tubes of the radially outer RO assembly and/or the radially inner RO assembly and enabling liquid flow therethrough.

13. The double-pass reverse-osmosis separator module according to claim 1, wherein the collection tube of the radially outer RO assembly and/or the collection tube of the radially inner RO assembly includes a closure for blocking liquid flow at one of the axial ends of the radially outer RO assembly and/or the radially inner RO assembly.

14. The double-pass reverse-osmosis separator module according to claim 1, wherein each of the radially inner RO assembly and the radially outer RO assembly is assembled as RO sub-modules; and
wherein the radially inner RO sub-module is telescopically inserted into an inner axial flow path defined by a radially inner tubular wall of the radially outer RO sub-module.

15. A pressure vessel including a first double-pass reverse osmosis separator module according to claim 1 operatively coupled with a second double-pass reverse osmosis separator module similar to the first double-pass reverse osmosis separator module.

16. A double-pass filter element, comprising:
a central perforate collection tube having an outlet end;
an inner wound separation media layer surrounding the central collection tube, the inner wound separation media layer including a reverse-osmosis membrane layer, a feed channel layer, and a permeate collection layer spirally wound around the central collection tube;
an outer perforate collection tube radially outwardly surrounding the inner wound separation media layer, with an annular flow gap therebetween; and
an outer wound separation media layer surrounding the outer perforate support core, the outer wound separation media layer including a membrane layer, a feed channel layer, and a permeate collection layer spirally wound around the central collection tube, wherein the membrane layer is selected from the group consisting of: microfiltration membrane, nanofiltration membrane, and ultrafiltration membrane;
wherein a feed liquid can flow through the outer wound separation media layer and separate into a first concentrate liquid and a first permeate liquid, the first permeate liquid passing through the outer perforate collection tube and into the annular flow gap, and then passing axially along the annular flow gap to the inner wound separation media layer for separation into a second concentrate liquid and a second permeate liquid, the second permeate liquid passing through the central perforate collection tube to the outlet end.

17. A method of filtering feed liquid via the double-pass reverse-osmosis separator module according to claim 1, comprising the steps:
passing the feed liquid into the feed inlet of the radially outer RO assembly for a first pass;
passing the first-pass feed liquid through the reverse-osmosis membrane layer of the reverse osmosis separation medium contained within the radially outer RO assembly, whereby the first-pass feed liquid is separated into a first-pass concentrate liquid and a first-pass permeate liquid;
passing the first-pass concentrate liquid through the concentrate outlet of the radially outer RO assembly;
passing the first-pass permeate liquid through the permeate outlet of the radially outer RO assembly,
after the first-pass permeate liquid exits the permeate outlet of the radially outer RO assembly, passing the first-pass permeate liquid into the feed inlet of the radially inner RO assembly as a feed liquid for a second pass;
passing the second-pass feed liquid through the reverse-osmosis membrane layer of the reverse osmosis separation medium contained within the radially inner RO assembly, whereby the second-pass feed liquid is separated into a second-pass concentrate liquid and a second-pass permeate liquid;
passing the second-pass concentrate liquid through the concentrate outlet of the radially inner RO assembly;
passing the permeate liquid through the permeate outlet of the radially inner RO assembly; and
collecting the second-pass permeate liquid after the second-pass permeate liquid exits the permeate outlet of the radially inner RO assembly.

18. The method of filtering a feed liquid according to claim 17, wherein the passing the first-pass feed liquid through the semi-permeable membrane of the reverse osmosis separation medium of the radially outer RO assembly includes applying a pressure between 500 to 1,000 psi to the first-pass feed liquid; and
wherein the passing the second-pass feed liquid through the semi-permeable membrane of the reverse osmosis separation medium of the radially inner RO assembly includes applying a pressure between 50 to 250 psi to the second-pass feed liquid.

19. The method of filtering a feed liquid according to claim 17, wherein the separating the first-pass feed liquid into the first-pass concentrate liquid and the first-pass permeate liquid via the reverse-osmosis membrane layer of the reverse osmosis separation medium of the radially outer RO assembly includes reducing the concentration of solute or other effluent from the first-pass feed liquid to the first-pass permeate liquid by at least 80%; and
wherein the separating the second-pass feed liquid into the second-pass concentrate liquid and the second-pass permeate liquid via the reverse-osmosis membrane layer of the reverse osmosis separation medium of the radially inner RO assembly includes reducing the concentration of solute or other effluent from the second-pass feed liquid to the second-pass permeate liquid by at least 80%.

* * * * *